Dec. 20, 1966  A. R. TENNISON  3,292,330
CLOSURE FOR AN EXPANSION JOINT
Filed May 24, 1965

INVENTOR.
ARTHUR R. TENNISON
BY *Pearce Schaeperklaus*

Attorneys

United States Patent Office 3,292,330
Patented Dec. 20, 1966

3,292,330
CLOSURE FOR AN EXPANSION JOINT
Arthur R. Tennison, Batavia Township, Clermont County,
Ohio (4041 Edwards Road, Cincinnati, Ohio 45209)
Filed May 24, 1965, Ser. No. 457,951
3 Claims. (Cl. 52—403)

This is a continuation-in-part of my copending application Serial No. 289,985, filed June 24, 1963, now abandoned.

This invention relates to expansion joints for masonry surfaces such as masonry walls and the like. More particularly, this invention relates to a closure for an expansion joint.

An object of this invention is to provide a sealing strip which can be inserted into an expansion joint to close the expansion joint and which can accommodate limited movement of the masonry members at opposite edges of the expansion joint without exposure of the joint.

A further object of this invention is to provide a sealing strip of rubber-like material having an arcuate or domed outer face which covers the expansion joint and leg members which fit into the expansion joint and engage walls thereof.

A further object of this invention is to provide a device of this type in which inner portions of the leg members are adhesively attached to faces of the walls of the joint and the remainder of the legs can stretch to accommodate limited movement of the walls.

The above and other objects and features of the invention will be apparent to those skilled in the art to which this invention pertains from the following detailed description, and the drawing, in which.

In the following detailed description, and the drawing, like reference characters indicate like parts.

Figure 2:
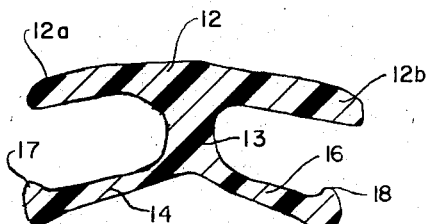
FIG. 2 is a view in section taken on the line 2—2 in FIG. 1.
Figure 1:
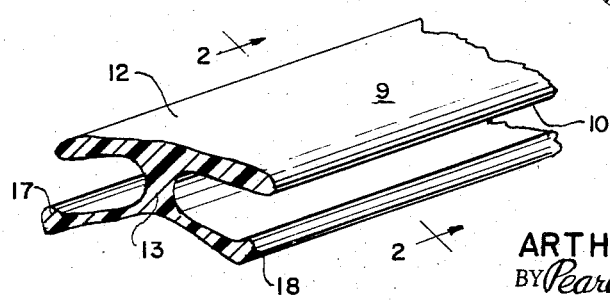
FIG. 1 is a perspective view of an expansion joint sealing strip constructed in accordance with an embodiment of this invention.

In FIG. 1 is shown a sealing strip 9 constructed in accordance with an embodiment of this invention. This strip includes a body 10, which can be formed as an extrusion and is formed of a rubber-like material such as a polyvinyl resin or the like. It includes a generally arc-shaped outer portion 12, which includes flanges 12a and 12b (FIG. 2) extending in opposite directions from a central portion 13. Legs 14 and 16 diverge downwardly therefrom. The legs 14 and 16 terminate in outwardly extending flanges or ribs 17 and 18, respectively.

Figure 3:
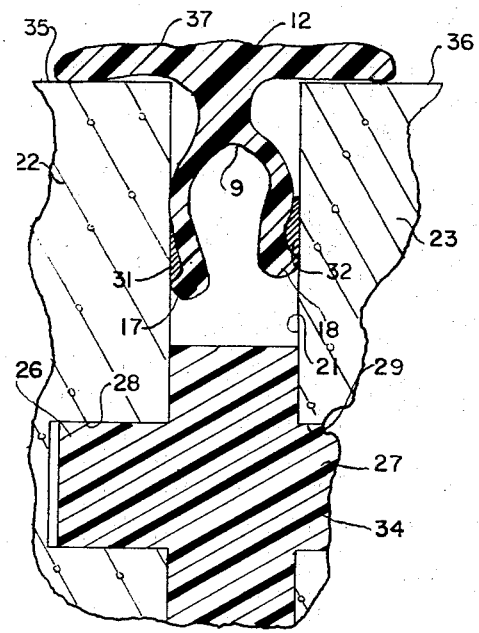
FIG. 3 is a view in transverse section of an expansion joint provided with the sealing strip.

As shown in FIG. 3, the strip 9 is constructed to be mounted in an expansion joint 21 between masonry wall sections or blocks 22 and 23. The blocks 22 and 23 may be held in alignment by an aligning member 34 of yieldable material such as rubber or the like having arms 26 and 27 received in slots 28 and 29 in the blocks 22 and 23, respectively. When the strip 9 is in position in the expansion joint 21, the legs 14 and 16 are compressed or bent toward each other with each leg engaging one of the blocks 22 and 23 at faces of the expansion joint 21 to hold the strip 9 in position with the arc-shaped outer portion 12 thereof bridging and closing the expansion joint. The flanges 17 and 18 of the strip 9 engage the walls of the joint and, in addition, each leg engages one of the walls of the joint or is closely spaced therefrom so that there are restricted substantially enclosed spaces between inner portions of the legs 14 and 16 and the blocks 22 and 23, respectively. These spaces are filled with portions 31 and 32 of an appropriate adhesive which attaches the inner portions of the legs to the walls of the joint. The adhesive attaches portions of the legs between the bends and the flanges 17 and 18 to the walls of the joint, but the remainder of the strip can flex to accommodate limited movement of the walls of the joint. Exposed faces 35 and 36 of blocks 22 and 23 and outer face 37 of the strip 9 can be painted or otherwise coated to give a substantially continuous decorative coating to the wall.

Figure 6:
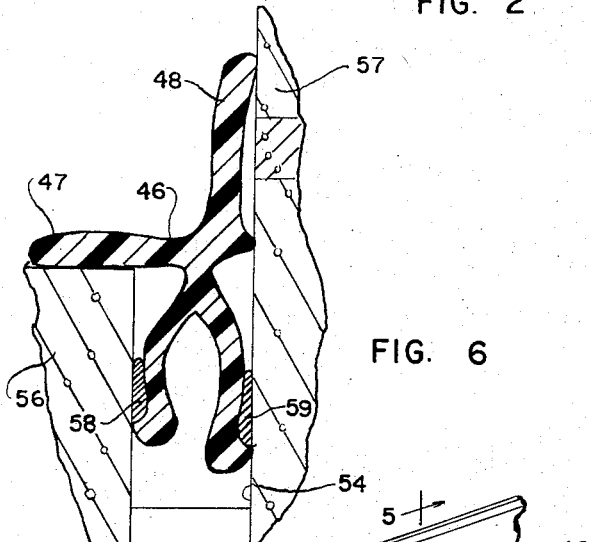
FIG. 6 is a view in transverse section showing the sealing strip of FIGS. 4 and 5 in place in an expansion joint.
Figure 5:
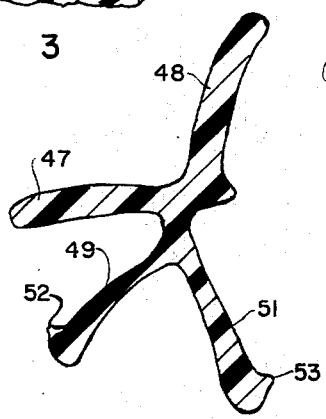
FIG. 5 is a view in section taken on the line 5—5 in FIG. 4.
Figure 4:
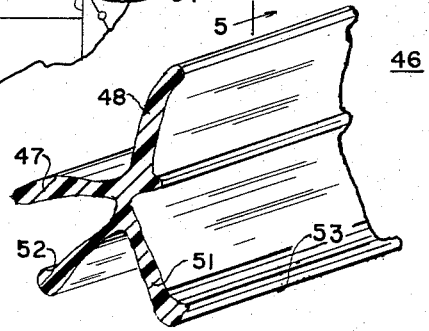
FIG. 4 is a perspective view of a sealing strip constructed in accordance with another embodiment of this invention.

In FIGS. 4, 5, and 6 is shown another expansion joint covering strip 46 which can be formed of the same type of material as the strip already described and which includes wall engaging portions or flanges 47 and 48 which extend substantially at right angles to each other. Legs 49 and 51 are integral therewith and diverge therefrom. The legs 49 and 51 terminate in outwardly projecting flanges or ribs 52 and 53, respectively. The legs 49 and 51 are adapted to be received in an expansion joint 54 between a main wall section 56 and a second wall section 57 extending at a right angle to the main wall section. Adhesive portions 58 and 59 similar to those already described, hold the strip 46 in position in the expansion joint.

The expansion joint covering strips illustrated in the drawing and described above are subject to structural modification without departing from the spirit and scope of the appended claims.

Having described my invention, what I claim as new and desire to secure by letters patent is:

1. In combination with spaced apart walls forming an elongated expansion joint, a closure for the expansion joint which comprises an elongated strip of resilient rubber-like material which includes a central portion, a pair of leg members integral therewith and diverging from one end of said central portion and received in the expansion joint, and outwardly extending flanges integral therewith and extending from the opposite end of the central portion and bridging and closing the expansion joint, and outwardly extending flanges at free ends of the legs engaging walls of the joint, the legs being bent inwardly intermediate the ends thereof thereby forming restricted spaces between the walls and the portions of the legs between the flanges and the bends thereof, and adhesive in said restricted spaces attaching said portions of the legs to the walls, the remainder of the closure being adapted to flex to accommodate limited relative movement of the walls.

2. In combination with spaced apart walls forming an elongated expansion joint, with said walls extending at right angles to each other, a closure for the expansion joint which comprises an elongated strip of resilient rubber-like material which includes a central portion, a pair of leg members integral therewith and diverging from one end of said central portion and received in the expansion joint, outwardly extending flanges integral therewith and extending from the opposite end of the central portion and bridging and closing the expansion joint, said flanges diverging at substantially a right angle, and outwardly extending flanges at free ends of the legs engaging walls of the joint, the legs being bent inwardly intermediate the ends thereof, thereby forming restricted spaces between the walls and the portions of the legs between the flanges and the bands thereof, and adhesive in said restricted spaces attaching said portions of the legs to the walls, the remainder of the strip being adapted to flex to accommodate limited relative movement of the walls.

3. In combination with spaced apart walls forming an elongated expansion joint, with said walls being substantially aligned, a closure for the expansion joint which comprises an elongated strip of resilient rubber-like material which includes a central portion, a pair of leg members integral therewith and diverging from one end of said central portion and received in the expansion joint, outwardly extending flanges integral therewith and extending from the opposite end of the central portion and bridging and closing the expansion joint, said flanges being substantially in alignment, and outwardly extending flanges at free ends of the legs engaging walls of the joint, the legs being bent inwardly intermediate the ends thereof, thereby forming restricted spaces between the walls and the portions of the legs between the flanges and the bends thereof, and adhesive in said restricted spaces attaching said portions of the legs to the walls, the remainder of the strip being adapted to flex to accommodate limited relative movement of the walls.

References Cited by the Examiner
UNITED STATES PATENTS

| | | | |
|---|---|---|---|
| 2,230,688 | 2/1941 | Irwin | 94—18 |
| 2,315,588 | 4/1943 | Brickman | 94—18 |
| 2,708,016 | 5/1955 | Penton | 94—18 |
| 2,746,103 | 5/1956 | Bright | 49—491 |
| 3,018,703 | 1/1962 | Fujihara | 94—18 |
| 3,179,026 | 4/1965 | Crone | 94—18 |

FOREIGN PATENTS

| | | |
|---|---|---|
| 1,198,881 | 5/1959 | France. |
| 1,260,252 | 3/1961 | France. |
| 1,283,939 | 1/1962 | France. |
| 661,080 | 6/1938 | Germany. |

RICHARD W. COOKE, Jr., *Primary Examiner.*

FRANK L. ABBOTT, *Examiner.*

M. O. WARNECKE, *Assistant Examiner.*